(12) United States Patent
Kim

(10) Patent No.: US 7,231,933 B2
(45) Date of Patent: Jun. 19, 2007

(54) FUEL STORAGE APPARATUS FOR VEHICLE

(75) Inventor: Jin-Mun Kim, Ulsan Metropolitan City (KR)

(73) Assignee: Hyundai Motor Company, Seoul (KR)

( * ) Notice: Subject to any disclaimer, the term of this patent is extended or adjusted under 35 U.S.C. 154(b) by 428 days.

(21) Appl. No.: 10/963,847

(22) Filed: Oct. 13, 2004

(65) Prior Publication Data

US 2005/0083636 A1   Apr. 21, 2005

(30) Foreign Application Priority Data

Oct. 16, 2003   (KR) ............... 10-2003-0072144

(51) Int. Cl.
*F16K 11/24* (2006.01)
*G05D 9/12* (2006.01)

(52) U.S. Cl. .................. 137/38; 220/720; 220/723

(58) Field of Classification Search ............... 137/38, 137/39, 45, 46, 48, 51, 205.5, 564.5; 220/720, 220/723
See application file for complete search history.

(56) References Cited

U.S. PATENT DOCUMENTS

| 2,324,464 | A | * | 7/1943 | Parker ..................... 137/38 |
| 2,831,490 | A | * | 4/1958 | Simcock ................... 137/38 |
| 2,973,121 | A | * | 2/1961 | Banker ..................... 137/45 |
| 5,560,342 | A | * | 10/1996 | Fournier et al. ........... 137/38 |
| 6,360,729 | B1 | * | 3/2002 | Ellsworth .................. 220/723 |

FOREIGN PATENT DOCUMENTS

| JP | 56-128221 | 7/1981 |
| JP | 60-199730 | 9/1985 |

* cited by examiner

*Primary Examiner*—Stephen M. Hepperle
(74) *Attorney, Agent, or Firm*—Morgan Lewis & Bockius LLP

(57) ABSTRACT

An airbag installed inside a fuel tank is manipulated when the vehicle is inclined along a slope without sufficient fuel in the tank such that the fuel in the tank is gravitated to one side thereof. Thereby, the remaining fuel is provided smoothly and consistently to the engine by optimally manipulating the leftover fuel of the fuel tank.

6 Claims, 3 Drawing Sheets

FUEL STORAGE APPARATUS FOR VEHICLE

CROSS-REFERENCE TO RELATED APPLICATIONS

This application claims priority of Korean Application No. 10-2003-0072144, filed on Oct. 16, 2003, the disclosure of which is hereby incorporated by reference herein in its entirety.

TECHNICAL FIELD OF THE INVENTION

Generally, the present invention relates to a fuel storage apparatus for a vehicle. More particularly, the apparatus is adapted to smoothly provide fuel to the engine even if the vehicle is inclined on a slope, with a small amount of fuel left in the fuel tank, and the tank is tilted to one side.

BACKGROUND OF THE INVENTION

Typically, a baffle is arranged inside a fuel tank of a vehicle to restrain the swaying of fuel. When the fuel is tilted to one side of the fuel tank when the vehicle is inclined on a slope or the like, the baffle ensures that fuel is steadily provided to the engine.

However, there is a drawback in the conventional fuel storage apparatus for a vehicle in that if the vehicle is parked on a slope for a long period of time with a small amount of fuel in the tank, the fuel may gradually be concentrated to one side of the fuel tank, causing a lack of fuel provision to the engine.

SUMMARY OF THE INVENTION

An embodiment of the present invention is provided to prevent a lack of fuel provision to the engine even if a vehicle is inclined on a slope with a small amount of fuel remaining inside the fuel tank is gravitated to one side of the tank.

A fuel storage apparatus for a vehicle according to an embodiment of the present invention comprises a fuel tank for storing fuel therein. A tilt sensor is installed on the fuel tank for detecting a tilt state of the fuel tank. Two airbags are installed at both inner sides of the fuel tank, respectively, for changing the storage capacity of the fuel tank by expansion and contraction operations. An air pump generates air pressure and provides that pressure to the airbags. A valve means provides the air pressure from the air pump to the airbags or discharges the air pressure of the airbags to the atmosphere. A controller controls the valve means and the air pump according to the signal of the tilt sensor.

BRIEF DESCRIPTION OF THE DRAWINGS

For a better understanding of the nature and objects of the present invention, reference should be made to the following detailed description, read in conjunction with the accompanying drawings, in which.

DETAILED DESCRIPTION OF PREFERRED EMBODIMENTS

Figure 1:
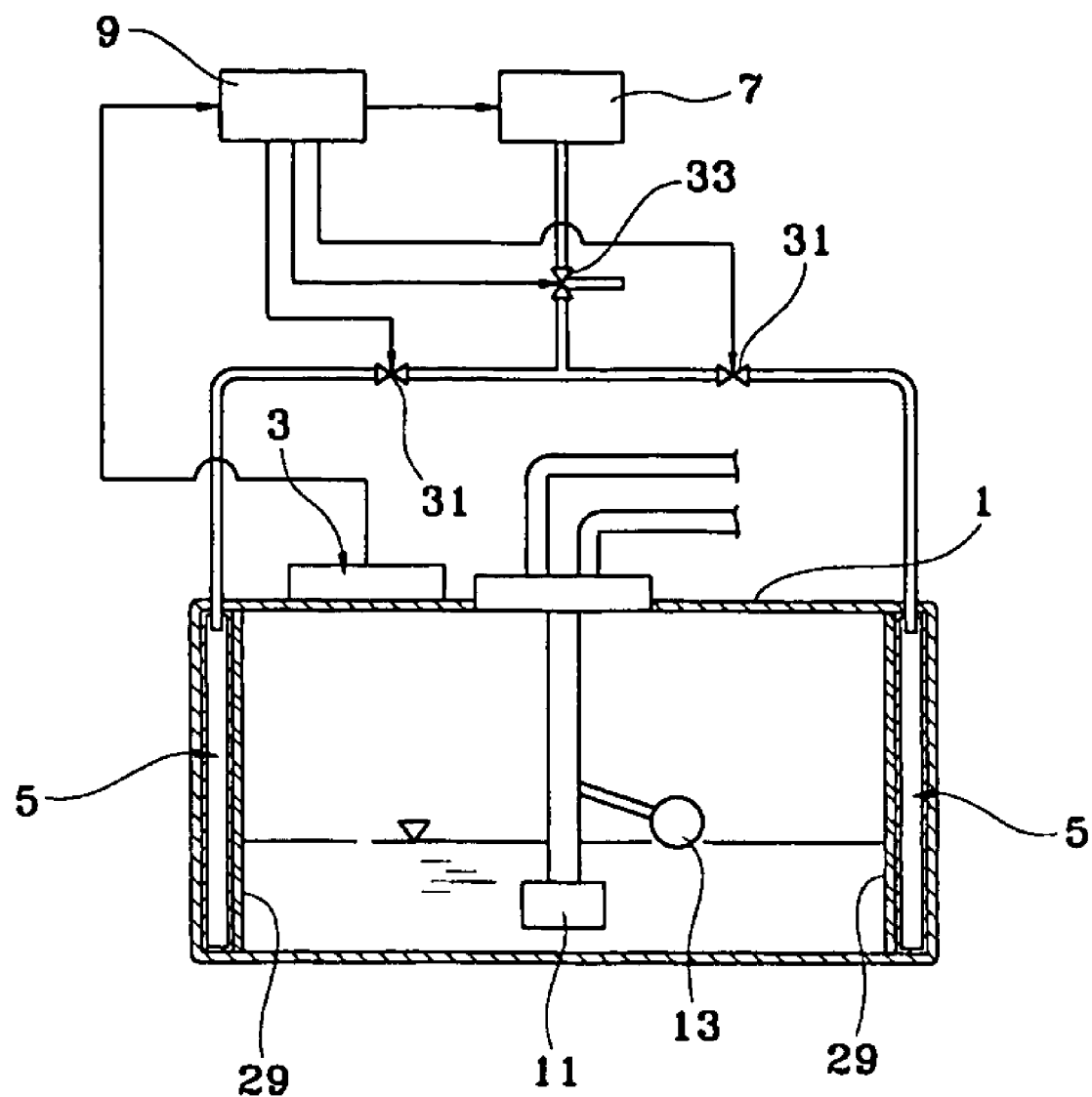
FIG. 1 is a cross sectional view of a fuel storage apparatus for a vehicle according to an embodiment of the present invention.

Referring to FIG. 1, a fuel storage apparatus for a vehicle includes a tilt sensor 3 installed at an upper side of a fuel tank 1. The tilt sensor detects a tilt state of the fuel tank 1, where a tilt state is a deviation from horizontal. Two airbags 5 are installed at both sides of the inner side of the fuel tank 1, respectively, for changing the storage capacity of the fuel tank 1 by expansion and contraction operations. An air pump 7 generates air pressure and provides that pressure to the airbags 5. A valve means provides the air pressure from the air pump 7 to the airbag 5 or discharges the air pressure of the airbag 5 to the atmosphere. A controller 9 controls the valve means and the air pump 7 according to the signal of the tilt sensor 3. A fuel pump 11 and a fuel gauge 13 are equipped inside the fuel tank 1 for pumping the fuel and for measuring the amount of fuel, respectively. In an embodiment of the invention, the controller 9 may comprise a processor and memory, as well as associated hardware and software as may be selected and programmed by a person of ordinary skill in the art base on the teachings contained herein.

Figure 2:
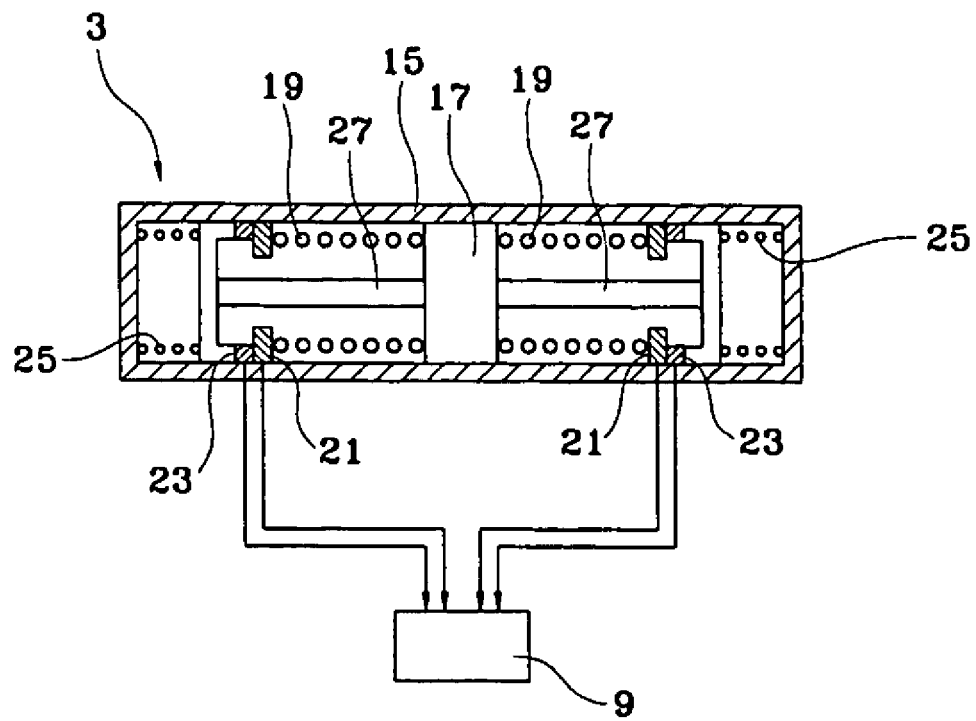
FIG. 2 is a cross sectional view of a tilt sensor of FIG. 1.
Figure 3:
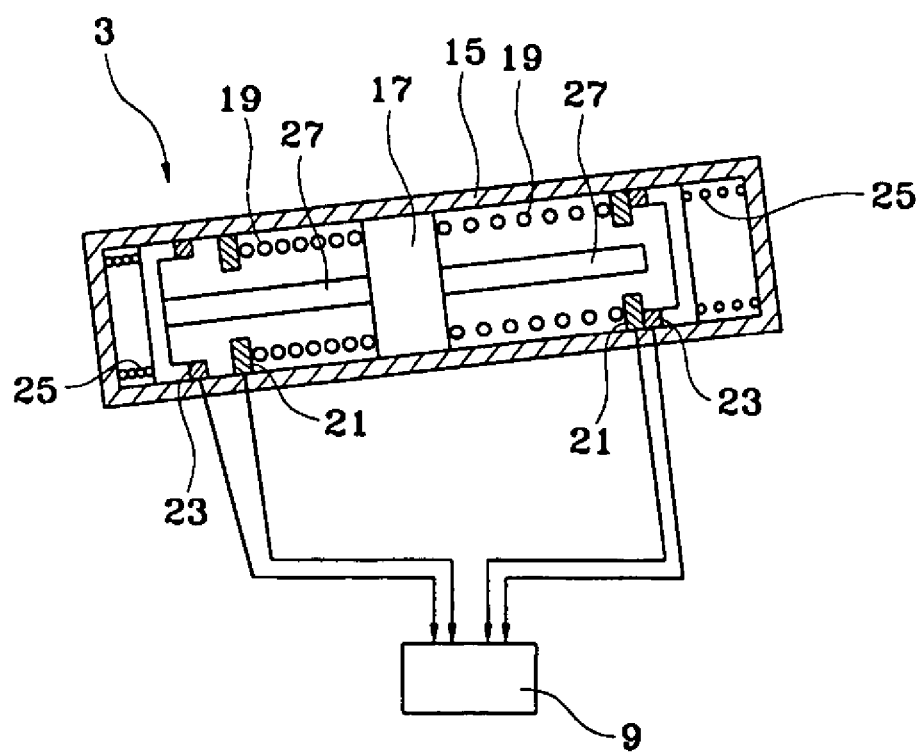
FIG. 3 is an operational state view of the tilt sensor of FIG. 2.

As illustrated in FIGS. 2 and 3, the tilt sensor 3 comprises a case 15 longitudinally formed along the horizontal direction. A mass block 17 is linearly slidably placed inside the case 15 along the longitudinal direction of the case 15. Two block springs 19 resiliently support the mass block 17 at both sides of the mass block 17 toward the central portion of the case 15. Stationary contact points 21 are distantly formed from both walls of the case 15 inside the case 15. Movable contact points 23 are linearly slidably equipped between the stationary contact points 21 and both walls of the case 15. A switch spring 25 resiliently supports the movable contact points 23 toward the stationary contact points 21. Push rods 27 are configured to extend from both sides of the mass block 17 along the longitudinal direction of the case 15 and to push the movable contact points 23.

The contact and separation states of the stationary contact points 21 and the movable contact points 23 of the tilt sensor 3 are inputted into the controller 9. The controller 9 internally determines which one of the pair of stationary contact points 21 and movable contact points 23 of the case 15 is separated from each other. In short, the tilted direction of the fuel tank 1, which integrally moves with the case 15, can be determined according to the above manners.

In case the fuel tank 1 is not inclined, both the stationary contact points 21 and movable contact points 23 are in a contact state with each other at both sides of the case 15, and the controller 9 detects that the fuel tank 1 is not in an inclined state.

The airbag 5 is provided with a movable plate 29. The movable plate 29 is attached to the airbag 5 at the inner portion of the fuel tank 1 for feasibly adjusting the capacity of the fuel tank 1. The valve means includes two control valves 31 and an exhaust valve 33, wherein the two control valves 31 provide the air pressure from the air pump 7 to the airbags 5. The exhaust valve 33 is configured to exhaust the air pressure contained inside the airbag 5 to the atmosphere via the control valve 31.

Referring back to FIG. 1, an air pressure path is connected from the air pump 7 to both airbags 5. The air pressure path is provided with the control valves 31 and the exhaust valve 33. Two control valves 31 are placed between the airbag 5 and the air pump 7, respectively, as illustrated for controlling the air pressure provided to each airbag 5 of both sides of the fuel tank 1. Further, the exhaust valve 33 is located between the two control valves 31 and the air pump 7. The exhaust valve 33 is provided with a port for communicating with the air pump 7, a port for communicating with the control valves 31, and a port for communicating with the atmosphere.

The fuel tank 1 is installed at the vehicle body with each airbag 5 facing the frontal and rear direction of the vehicle. The tilt sensor 3 is installed at the fuel tank 1, wherein the longitudinal direction of the tilt sensor 3 is parallel to the anteroposterior direction of the vehicle.

The operation of the present invention will now be described below.

Provided that a vehicle is parked on a slope without sufficient fuel in the fuel tank 1, the fuel inside the fuel tank 1 gravitates downward. The tilt sensor 3, integrally moving with the fuel tank 1, inclines according to the tilt of the fuel tank 1 and the mass block 17 of the inner side of the case 15 of the tilt sensor 3 also gravitates downward. The push rod 27 of the mass block 17 pushes down the movable contact point 23 located at a lower side of the tilted case 15, thereby separating the movable contact point 23 from the stationary contact point 21. With reference to FIG. 3, as the mass block 17 moves down to the left side in the FIG., the movable contact point 23 of the left side separates from the stationary contact point 21 of the left side. The variation of the tilt sensor 3 is inputted into the controller 9, and the controller 9 detects whether the vehicle is tilted and to which side the vehicle is tilted.

Once the controller 9 detects that the vehicle is tilted, the controller 9 activates the air pump 7 for expanding the airbag 5, which is located at a lower side of the tilted fuel tank 1. The controller 9 closes the port of the atmosphere side of the exhaust valve 33 and manipulates the valve to provide air pressure from the air pump 7 to the control valves 31. The controller 9 then opens the control valve 31 placed at the side where the fuel tank 1 is tilted as shown in FIG. 4.

Figure 4:
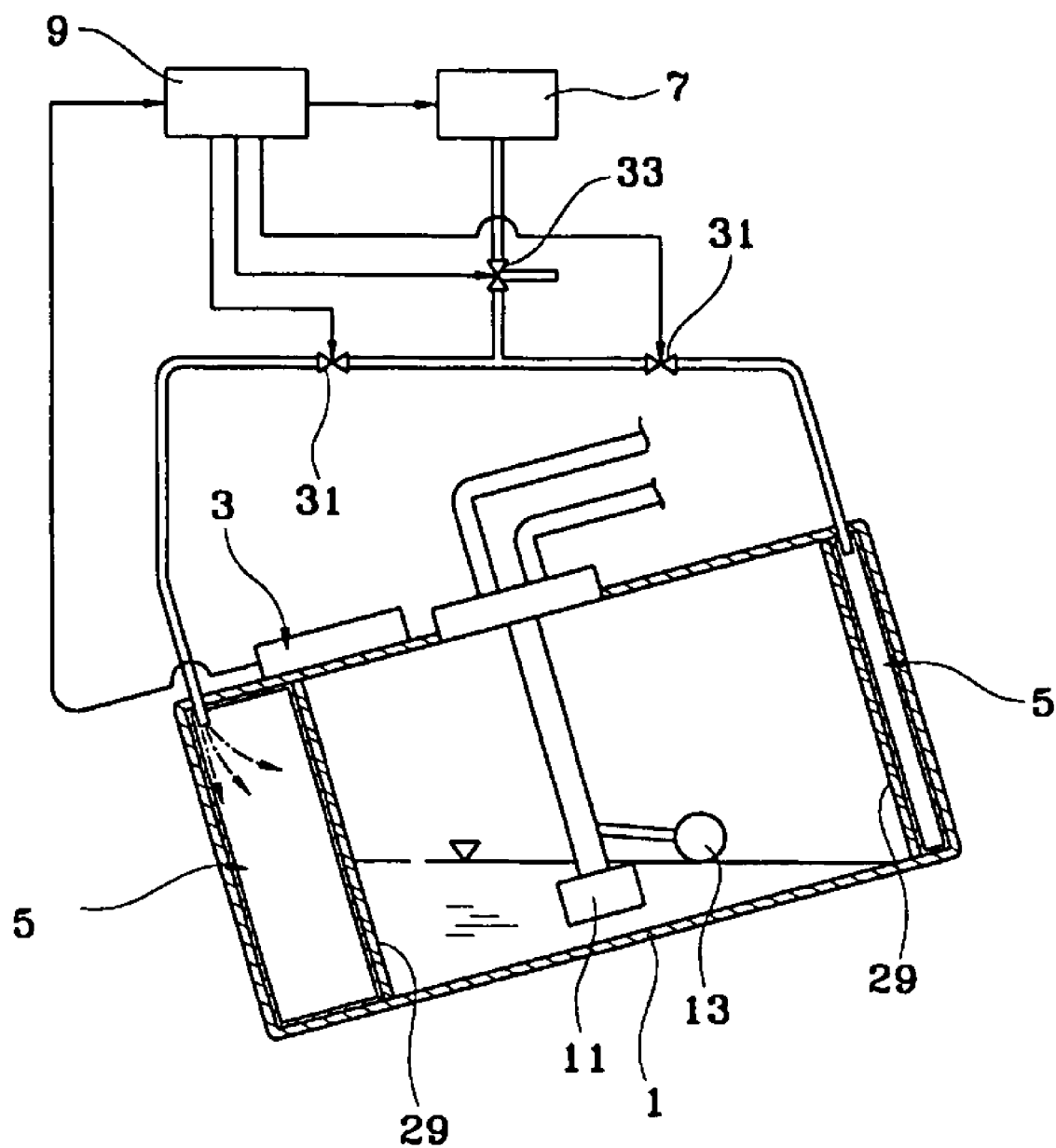
FIG. 4 is an operational state view of a fuel storage apparatus according to an embodiment of the present invention.

According to FIG. 4, as the airbag 5 expands, the fuel moves upward and the fuel pump 11 submerges in the fuel. Accordingly, the fuel can be smoothly and consistently provided from the fuel pump 11 to the engine.

In short, even if the vehicle is in a parked state on a slope for a long period of time without sufficient fuel, the present invention can optimally apply the remaining fuel to start the vehicle smoothly. When the vehicle is in a horizontal state, the controller 9 detects the state from the tilt sensor 3 and opens the control valve 31 and the port of the atmosphere side of the exhaust valve 33 for discharging the air inside the airbag 5 to the atmosphere. Even if the vehicle moves on a flat land after the ignition key has been turned on while inclined along a slope, the present invention can maintain air in the airbag 5 in order to maintain the high level of the fuel. Furthermore, when the vehicle is filled up with gasoline, the controller 9 can exhaust the air from the airbag 5 via a separate switch, a detecting means or the like.

As apparent from the foregoing, there are advantages in the present invention in that when the vehicle is located on a slope, or the like, with low levels of fuel in the fuel tank and the fuel is inclined to one side of the tank, the airbag mounted inside the fuel tank is manipulated, thereby smoothly providing fuel to the engine by maximally manipulating the remaining fuel of the fuel tank.

What is claimed is:

1. A fuel storage apparatus for a vehicle, the apparatus comprising:

a fuel tank for storing fuel, said fuel tank having a storage capacity;

a tilt sensor installed on said fuel tank for detecting a tilt state of said fuel tank and generating a signal representative thereof;

two airbags installed at both inner sides of said fuel tank for varying the storage capacity of said fuel tank by expansion and contraction operations;

an air pump generating air pressure for providing that pressure to said airbags;

valve means for providing the air pressure from said air pump to said airbags or for discharging the air pressure of said airbags to the atmosphere; and a controller for controlling said valve means and said air pump according to the signal of said tilt sensor.

2. The apparatus as defined in claim 1, wherein said tilt sensor comprises:

a case longitudinally formed along a horizontal direction;

a mass block linearly slidably placed inside said case along the longitudinal direction of said case;

two block springs for resiliently supporting said mass block at both sides of said mass block toward a central portion of said case;

stationary contact points distantly formed from both sides of said case inside said case;

movable contact points linearly slidably equipped between said stationary contact points and both walls of said case;

a switch spring for resiliently supporting said movable contact points towards said stationary contact points; and push rods configured to extend from both sides of said mass block along the longitudinal direction of said case and to push said movable contact points.

3. The apparatus as defined in claim 1, wherein a movable plate is further attached to said airbag at an inner side of said fuel tank for easily adjusting a capacity of said fuel tank.

4. The apparatus as defined in claim 1, wherein said valve means includes: a control valve for providing the air pressure from said air pump to said airbag; and an exhaust valve for discharging the air pressure contained inside said airbag to the atmosphere via said control valve.

5. A fuel storage apparatus for a vehicle, comprising:

a fuel tank having a storage capacity for storing fuel;

a tilt sensor for detecting a tilt state of said fuel tank;

at least two airbags installed within said fuel tank for varying the storage capacity of said fuel tank by expansion and contraction of said at least two airbags;

an air pump for generating air pressure for pressurizing said airbags;

a valve means for providing the air pressure from said air pump to said airbags or for discharging the air pressure of said airbags; and a controller for controlling said valve means and said air pump according to a signal of said tilt sensor.

6. A fuel storage apparatus for a vehicle, comprising:

a fuel tank having a storage capacity for storing fuel;

a tilt sensor for detecting a tilt state of said fuel tank;

an airbag installed within said fuel tank for varying the storage capacity of said fuel tank by inflation and deflation of said airbag; and a controller for controlling inflation and deflation of said airbag in response to a signal from said tilt sensor.

* * * * *